3,369,033
8,11,14-ESTRONE AND INTERMEDIATES IN
THE PRODUCTION THEREOF
Luciano Re, South Orange, N.J., assignor to Merck &
Co., Inc., Rahway, N.J., a corporation of New Jersey
No Drawing. Filed Aug. 18, 1965, Ser. No. 480,765
18 Claims. (Cl. 260—397.45)

ABSTRACT OF THE DISCLOSURE

The invention disclosed herein is concerned with a novel synthesis of d,l-8-dehydroestrone and intermediate compounds useful in the synthesis thereof. More particularly, this invention relates to a synthesis of d,l-8-dehydroestrone starting with 1,2,3,4,7,8 - hexahydro-6-lower alkoxy-naphthalene-1-one or 6-lower alkoxy-1-tetralone. In this synthesis, the 6-lower alkoxy-1-tetralone is reacted with 2-ethylvinyl magnesium bromide to form 1,2,3,4-tetrahydro - 6 - lower alkoxy-1-(1-butenyl)-1-naphthol which, by reaction with succinic anhydride, is converted to d,l-8,11,14-tridehydroestrone. The latter compound is then reacted with hydrogen to produce d,l-dehydroestrone. d,l-8-dehydroestrone may be converted to d,l-estrone according to the procedure in the publication in Steroids, vol. 4, page 31 (1964).

The novel synthesis of this invention may be schematically represented as follows:

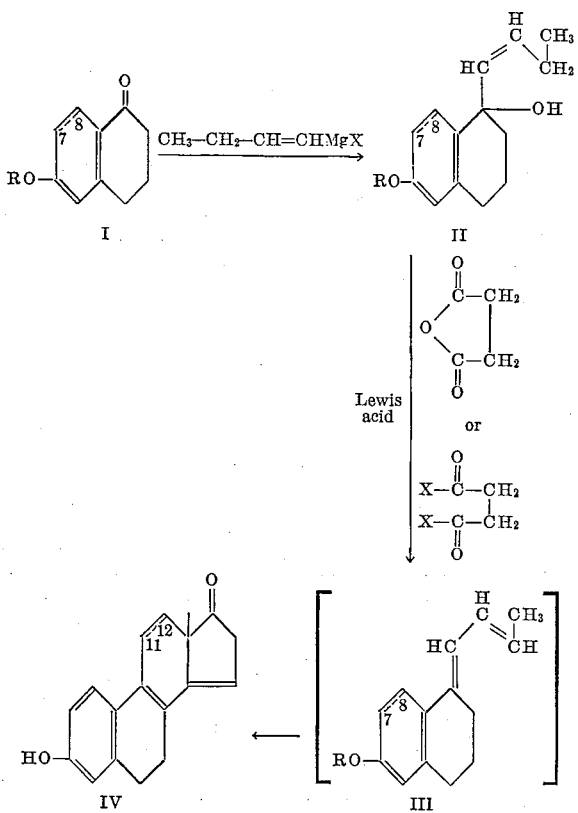

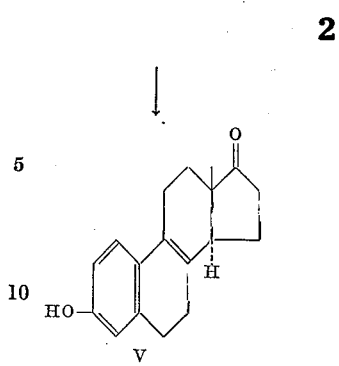

wherein the dotted line in Compounds I, II, and III between the C-7 and C-8 carbon atoms and the dotted line between the C-11 and C-12 carbon atoms of Compound IV indicates these bonds are single or double bonds, R is a lower alkyl substituent, preferably having not more than five carbon atoms, and X is chlorine or bromine.

The first step in the novel synthesis of this invention is the reaction of each 1,2,3,4,7,8-hexahydro-6-lower alkoxy-naphthalene-1-one and 6-lower alkoxy-1-tetralone (Compound I) with 2-ethylvinyl magnesium bromide or chloride to provide 1,2,3,4,7,8-hexahydro-6-lower alkoxy-1-(1 - butenyl) - 1 - naphthol or 1,2,3,4-tetrahydro-6-lower alkoxy - 1 - (1-butenyl)-1-naphthol, respectively (Compound II). In the second step, each of 1,2,3,4,7,8-hexahydro-6-lower alkoxy-1-(1-butenyl)-1-naphthol and 1,2,3,4-tetrahydro - 6-lower alkoxyl-1-(1-butenyl) - 1-naphthol is reacted with succinic anhydride or succinyl dihalide, such as succinyl dichloride or dibromide, in the presence of a Lewis acid, such as anhydrous aluminum chloride, hydrogen fluoride or boron trifluoride, to provide d,l-8,14-bisdehydroestrone or d,l-8,11,14-trisdehydroestrone, respectively (Compound IV). In the second reaction step, 1,2,3,4,7,8 - hexahydro - 6-lower alkoxy-1-(1-butenyl)-1-naphthol and 1,2,3,4-tetrahydro-6-lower alkoxy-1-(1-butenyl-1-naphthol are each dehydrated to provide the intermediate compounds 1,2,3,4,7,8 - hexahydro-6-lower alkoxy - 1 - (2-butenylidene)naphthalene and 1,2,3,4-tetrahydro-6-lower alkoxy-1-(2-butenylidene)naphthalene, respectively (Compound III), which are not isolated during the reaction but react as formed under the reaction conditions used with succinic anhydride or succinyl halide to form Compound IV. In the third step, each of d,l-8-14-bisdehydroestrone and d,l-8,11,14-trisdehydroestrone is hydrogenated to provide d,l-8-dehydroestrone (Compound V).

The reaction between 6-lower alkoxy-1-tetralone and 2-ethylvinyl magnesium halide is conveniently accomplished by adding a solution of 6-lower alkoxy-1-tetralone in anhydrous tetrahydrofuran and anhydrous ether to a solution of 2-ethylvinyl magnesium halide in anhydrous tetrahydrofuran and anhydrous ether while the temperature of the reactants and the reaction mixture is maintained at about −10° C. to −20° C. After addition is complete, the reaction mixture is stirred for about three hours at the same temperature, allowed to rise slowly to room temperature and to stand overnight and then refluxed for about two hours. In the reaction of 1,2,3,4,7,8-hexahydro-6-lower alkoxy-naphthalene-1-one with 2-ethylvinyl magnesium halide, the reaction mixture is stirred at room temperature for about 24 hours and then refluxed for about one and one-half hours after addition is complete. The reaction product may be isolated by pouring the reaction mixture into an iced ammonium chloride solution, separating the organic layer and extracting the aqueous layer with ether. The ether extract is combined with the organic layer and the resulting organic solution is dried over anhydrous magnesium sulfate and filtered. The solvent is removed by distillation under reduced pressure. The residue is Compound II.

The conversion of Compound II to Compound IV is conveniently accomplished in one step by adding Compound II with stirring to a suspension of succinic anhydride or succinyl dihalide and anhydrous Lewis acid, preferably anhydrous aluminum chloride, in an organic solvent, such as benzene, xylene, toluene or 1,2-dichloroethane containing a small amount of hydroquinone. After addition is complete, the mixture is heated to about 85° C. and maintained at that temperature for about two hours. To isolate the reaction product, the solution is cooled and poured into an iced aqueous hydrochloric acid solution. The solvent layer is separated from the resulting mixture and the aqueous layer is extracted with chloroform. The chloroform extract is combined with the solvent layer and the combined solution is washed with dilute aqueous sodium bicarbonate solution until neutral, washed with water and dried over magnesium sulfate. The solvents are removed by distillation under reduced pressure. The residue is crude Compound IV and may be purified by chromatography.

Compound IV may be hydrogenated to produce d,l-8-dehydroestrone (Compound V) by the hydrogenation of a solution of Compound IV in an organic solvent, such as tetrahydrofuran, containing 2% palladised calcium carbonate. Hydrogenation is conducted at room temperature and atmospheric pressure until one molecular equivalent of hydrogen is absorbed when Compound IV has a single bond between the C–11 and C–12 carbon atoms and until two molecular equivalents of hydrogen are absorbed when Compound IV has a double bond between the C–11 and C–12 carbon atoms. d,l-8-dehydroestrone may be isolated from the reaction mixture by filtering to remove the catalyst and removal of the organic solvent by distillation under reduced pressure.

d,l-8-dehydroestrone may be readily converted to d,l-estrone by known procedure, such as the isomerization of the $\Delta^8$-double bond to a $\Delta^{9(11)}$-double bond by refluxing a solution of d,l-8-dehydroestrone in tetrahydrofuran containing hydrochloric acid for about one hour, isolating the resulting d,l-9-(11)-dehydroestrone and hydrogenating the d,l-9(11)-dehydroestrone in tetrahydrofuran solution in the presence of a catalytic amount of 10% palladised calcium carbonate.

1,2,3,4,7,8-hexahydro-6-lower alkoxy-naphthalene-1-one may readily be prepared from 1,2,3,4,5,8-hexahydro-6-lower alkoxy-naphthalene-1-one by stirring a solution of 1,2,3,4,5,8 - hexahydro-6-lower alkoxy-naphthalene-1-one in methanol containing a strong base, such as sodium hydroxide or potassium hydroxide, at room temperature for about one hour. 1,2,3,4,7,8-hexahydro-6-lower alkoxy-naphthalene-1-one may be isolated from the reaction mixture by adding water, extracting with ether, washing the ether extract with water, drying the ether extract over anhydrous magnesium sulfate and removing the ether by distillation under reduced pressure. The residual oil is 1,2,3,4,7,8 - hexahydro-6-lower alkoxy-naphthalene-1-one.

The following examples illustrate methods of carrying out the present invention, but it is to be understood that these examples are given for purposes of illustration and not of limitation.

EXAMPLE 1

*1,2,3,4-tetrahydro-6-methoxy-1-(1-butenyl)-1-naphthol*

41 grams of 2-ethylvinyl bromide in solution in 30 ml. of tetrahydrofuran are added to 6 g. of magnesium turnings in 50 ml. of anhydrous tetrahydrofuran containing a trace of iodine. Addition is made with stirring in an atmosphere of nitrogen while the temperature of the reaction mixture at the beginning of the addition is about 30° C. with gentle warming. As the addition progresses and the reaction starts and until all of the 2-ethylvinyl bromide solution has been added, the temperature of the reaction mixture is kept at 40–45° C. by external cooling. After addition is complete, the reaction mixture is refluxed for about 30 minutes, cooled to −20° C. and diluted with 70 ml. of anhydrous ether. A solution of 12 g. of 6-methoxy-1-tetralone in 10 ml. of anhydrous tetrahydrofuran and 70 ml. of anhydrous ether is slowly added while the temperature of the reaction mixture is maintained at about −15° C. After addition is complete, the reaction mixture is stirred for three hours while the temperature is maintained at about −15° C. After addition is complete, the reaction mixture is allowed to come to room temperature and to stand overnight at room temperature. The reaction mixture is then refluxed for about two hours, cooled and poured into a mixture of 32 g. of ammonium chloride and 200 g. of ice. The organic layer is separated and the aqueous layer is extracted three times with ether and combined with the organic layer. This solution is dried over anhydrous magnesium sulfate and filtered. The solvents are removed by distillation under reduced pressure. The residue is 1,2,3,4 - tetrahydro-6-methoxy-1-(1-butenyl)-1-naphthol.

EXAMPLE 2

*1,2,3,4,7,8 - hexahydro - 6 - methoxy - 1 - (1-butenyl)-1-naphthol*

67.5 grams of 2-ethylvinyl bromide in solution in 60 ml. of tetrahydrofuran are added to 8.8 g. of magnesium turnings in 55 ml. of anhydrous tetrahydrofuran containing a trace of iodine. Addition is made with stirring in an atmosphere of nitrogen while the temperature of the reaction mixture at the beginning of the addition is at about 30° C. with gentle warming. As the reaction starts and until all of the 2-ethylvinyl bromide solution has been added, the temperature of the reaction mixture is kept at 40–45° C. by external cooling. After addition is complete, the reaction mixture is refluxed for about 30 minutes and then cooled to −20° C. A solution of 17.8 g. of 1,2,3,4,7,8 - hexahydro-6-methoxy-naphthalene-1-one in 25 ml. of anhydrous tetrahydrofuran and 75 ml. of anhydrous ether is slowly added while the temperature of the reaction mixture is maintained at about −15° C. After addition is complete, the reaction mixture is stirred for 24 hours at room temperature and then refluxed for about 1.5 hours, cooled and poured into a mixture of 46 g. of ammonium chloride and 220 g. of ice. The organic layer is separated and the aqueous layer is extracted three times with ether and combined with the organic layer. This solution is dried over anhydrous magnesium sulfate and filtered. The solvents are removed by distillation under reduced pressure. The residue is 1,2,3,4,7,8-hexahydro-6-methoxy-1-(1-butenyl)-1-naphthol.

EXAMPLE 3

*d,l-8,11,14-trisdehydroestrone*

23.2 grams of 1,2,3,4 - tetrahydro - 6-methoxy-1-(1-butenyl)-1-naphthol dissolved in 30 ml. of 1,2-dichloroethane is added slowly with stirring to a suspension of 10 g. of succinic anhydride and 40 g. of anhydrous aluminum chloride in 70 ml. of 1,2-dichloroethane containing 0.1 g. of hydroquinone. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is crude d,l-8,11,14-trisdehydroestrone and is purified by chromatographing on neutral alumina.

EXAMPLE 4

*d,l-8,11,14-trisdehydroestrone*

23.2 grams of 1,2,3,4 - tetrahydro-6-methoxy-1-(1-butenyl)-1-naphthol dissolved in 30 ml. of 1,2-dichloroethane is added slowly with stirring to a suspension of 15.5 g. of succinyl chloride and 40 g. of anhydrous aluminum chloride in 70 ml. of 1,2-dichloroethane containing 0.1 g. of hydroquinone. After addition is complete, the mixture is refluxed for two hours, cooled to room temperature and poured into a mixture of 250 ml. of 2 N hydrochloric acid and 250 g. of ice. The mixture is stirred for 30 minutes, and the organic layer is separated. The aqueous layer is extracted three times with chloroform, and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is crude d,l-8,11,14-trisdehydroestrone and is purified by chromatographing on neutral alumina.

EXAMPLE 5

*d,l-8,14-bisdehydroestrone*

23.4 grams of 1,2,3,4,7,8-hexahydro-6-methoxy-1-(1-butenyl)-1-naphthol dissolved in 30 ml. of 1,2-dichloroethane is added slowly with stirring to a suspension of 10 g. of succinic anhydride and 40 g. of anhydrous aluminum chloride in 70 ml. of 1,2-dichloroethane containing 0.1 g. of hydroquinone. After addition is complete, the mixture is refluxed for two hours, cooled to room temperature, and poured into a mixture of 250 ml. of 2 N hydrochloric acid and 250 g. of ice. The mixture is stirred for 30 minutes, and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is crude d,l-8,14-bisdehydroestrone and is purified by chromatographing on neutral alumina.

EXAMPLE 6

*d,l-8,14-bisdehydroestrone*

23.4 grams of 1,2,3,4,7,8 - hexahydro-6-methoxy-1-(1-butenyl)-1-naphthol dissolved in 30 ml. of 1,2-dichloroethane is added slowly with stirring to a suspension of 15.5 g. of succinyl chloride and 40 g. of anhydrous aluminum chloride in 70 ml. of 1,2-dichloroethane containing 0.1 g. of hydroquinone. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is crude d,l-8,14-bisdehydroestrone and is purified by chromatographing on neutral alumina.

EXAMPLE 7

*d,l-8-dehydroestrone*

A solution of 2 g. of d,l-8,11,14-trisdehydroestrone in 100 ml. of tetrahydrofuran containing 1 g. of 2% palladised calcium carbonate is hydrogenated at room temperature and atmospheric pressure until two equivalents of hydrogen are absorbed. The solution is filtered to remove the catalyst, and the solvent is removed by distillation under reduced pressure. The residue is d,l-8-dehydroestrone which is purified by crystallization from methanol.

EXAMPLE 8

*1,2,3,4,7,8-hexahydro-6-methoxy-naphthalene-1-one*

A solution of 1 g. of 1,2,3,4,5,8-hexahydro-6-methoxy-naphthalene-1-one in 10 ml. of methanol containing 0.5 ml. of 3 N sodium hydroxide is stirred for one hour at room temperature. Fifty milliliters of water are added to the reaction mixture and the resulting mixture is extracted three times with 50 ml. portions of ether. The ether extracts are combined, washed with water and dried over anhydrous magnesium sulfate. The ether is removed by distillation under reduced pressure. The residue is 1,2,3,4,7,8 - hexahydro-6-methoxy-naphthalene - 1 - one.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of a compound of the formula:

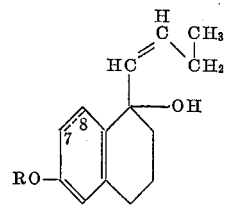

in which R is a lower alkyl radical and the dotted line between the C-7 and C-8 carbon atoms indicates that bond is a single or double bond, which comprises reacting a compound of the formula:

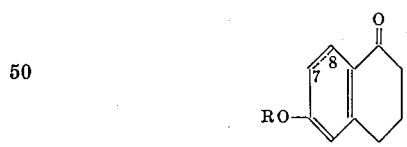

in which R and the dotted line between the C-7 and C-8 carbon atoms have the same significance as above, with 2-ethylvinyl magnesium bromide or chloride.

2. A process according to claim 1 in which the bond between the C-7 and C-8 carbon atoms is a single bond.

3. A process according to claim 1 in which the bond between the C-7 and C-8 carbon atoms is a double bond.

4. A process for the preparation of a compound of the formula:

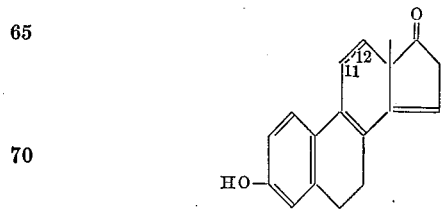

in which the dotted line between the C-11 and C-12 carbon atoms indicates that bond is a double or single bond, which comprises reacting a compound of the formula:

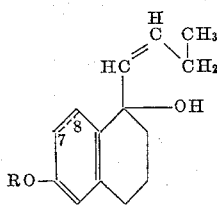

in which R is a lower alkyl radical and the dotted line between the C–7 and C–8 carbon atoms indicates that bond is a double or single bond, with succinic anhydride or succinyl dihalide in the presence of a Lewis acid.

5. A process according to claim 4 in which the reagent is succinic anhydride and the Lewis acid is aluminum chloride.

6. A process according to claim 4 in which the reagent is succinyl chloride and the Lewis acid is aluminum chloride.

7. A process according to claim 4 in which the bonds between the C–11 and C–12 carbon atoms and between the C–7 and C–8 carbon atoms are single bonds.

8. A process according to claim 4 in which the bonds between the C–11 and C–12 carbon atoms and between the C–7 and C–8 carbon atoms are double bonds.

9. A process for the preparation of d,l-8-dehydroestrone which comprises hydrogenating a compound of the formula:

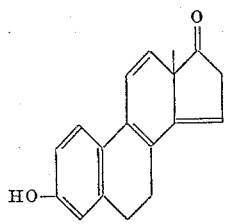

10. A process for the preparation of d,l-8-dehydroestrone which comprises reacting a compound of the formula:

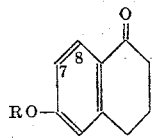

in which R is a lower alkyl radical and the dotted line between the C–7 and C–8 carbon atoms indicates that bond is a single or double bond, with 2-ethylvinyl magnesium bromide or halide to provide a compound of the formula:

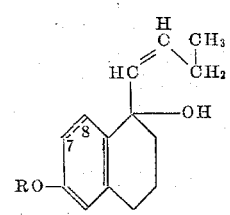

in which R and the dotted line between the C–7 and C–8 carbon atoms have the same significance as above, reacting the latter compound with succinic anhydride or succinyl dihalide in the presence of a Lewis acid to provide a compound of the formula:

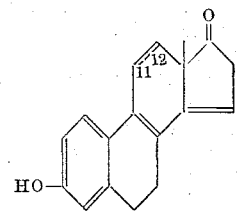

in which the dotted line between the C–11 and C–12 carbon atoms indicates that bond is a single or double bond; and hydrogenating the latter compound.

11. A process according to claim 10 in which the bond between the C–7 and C–8 carbon atoms is a single bond.

12. A process according to claim 10 in which the bond between the C–7 and C–8 carbon atoms is a double bond.

13. A compound of the formula:

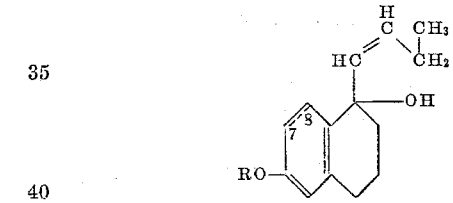

wherein R is a lower alkyl radical and the dotted line between the C–7 and C–8 carbon atoms indicates that bond is a single or double bond.

14. 1,2,3,4,7,8 - hexahydro - 6 - lower alkoxy-1-(1-butenyl)-1-naphthol.

15. 1,2,3,4-tetrahydro - 6 - lower alkoxy-1-(1-butenyl)-1-naphthol.

16. 1,2,3,4,7,8-hexahydro - 6 - methoxy-1-(1-butenyl)-1-naphthol.

17. 1,2,3,4 - tetrahydro - 6 - methoxy-1-(1-butenyl)-1-naphthol.

18. d,l-8,11,14-trisdehydroestrone.

No references cited.

ELBERT L. ROBERTS, *Primary Examiner.*